US006450018B1

(12) United States Patent
Möbius

(10) Patent No.: US 6,450,018 B1
(45) Date of Patent: Sep. 17, 2002

(54) PROCESS AND DEVICE FOR MONITORING AND OBSERVATION OF AGING OF A CATALYTIC CONVERTER IN EXHAUST GAS OF INTERNAL COMBUSTION ENGINES AND OF EMISSION OF HAZARDOUS MATERIALS

(75) Inventor: Hans-Heinrich Möbius, Greifswald (DE)

(73) Assignee: Herneus Electro-Nite International N.V., Houthalen (BE)

( * ) Notice: Subject to any disclaimer, the term of this patent is extended or adjusted under 35 U.S.C. 154(b) by 0 days.

(21) Appl. No.: 09/431,200

(22) Filed: Nov. 1, 1999

(30) Foreign Application Priority Data

Nov. 2, 1998 (DE) .......................................... 198 50 338

(51) Int. Cl.⁷ .............................................. G01L 19/00

(52) U.S. Cl. ........................ 73/118.1; 73/23.32; 60/277

(58) Field of Search ............................. 73/23.31, 23.32, 73/116, 117.3, 118.1; 60/276, 277; 340/438, 439; 701/30, 31, 109

(56) References Cited

U.S. PATENT DOCUMENTS

| 5,419,122 A | * | 5/1995 | Tabe et al. ..................... 60/277 |
| 5,815,828 A | * | 9/1998 | Nankee et al. ............... 701/109 |
| 5,869,743 A | * | 2/1999 | Jones et al. ................. 73/23.31 |
| 5,878,567 A | * | 3/1999 | Adamczyk et al. ........... 60/274 |
| 6,145,302 A | * | 11/2000 | Zhang et al. .................. 60/277 |

FOREIGN PATENT DOCUMENTS

| DE | 23 04 622 | 8/1974 |
| DE | 24 44 334 A1 | 3/1976 |
| DE | 26 43 739 A1 | 3/1978 |
| DE | 41 39 560 A1 | 6/1993 |
| DE | 42 11 092 A | 10/1993 |
| DE | 42 11 092 A1 | 10/1993 |
| DE | 42 11 116 A1 | 10/1993 |
| DE | 43 30 997 A1 | 3/1995 |

(List continued on next page.)

OTHER PUBLICATIONS

M. Sideris, *Method for Monitoring and Diagnosing the Efficiency of Catalytic Converters*, Chap. 3.5, pp. 335–349, Elsevier Science B.V., Amsterdam (1998).

Primary Examiner—George Dombroske
(74) Attorney, Agent, or Firm—Akin, Gump, Strauss, Hauer & Feld, L.L.P.

(57) ABSTRACT

The major part of the hazardous material quantities emitted by motor vehicles having an exhaust gas catalytic converter accrues in the start-up phases in which the catalytic converter is not yet at the operating temperature. The catalytic converter first begins to operate after it is heated up to the light-off temperature. The heat-up times must be kept as short as possible. With aging of the catalytic converter, the light-off temperature gradually increases, and thus, the heat-up time as well as the emitted hazardous material quantity also increases. In order to monitor the catalytic converter and thus the major part of the hazardous material emission, the light-off temperature must be repeatedly measured. Since this temperature cannot be read out clearly from the temperature-time curve of the catalytic converter after the start-up of the motor, the signal of a sensor for oxygen, carbon dioxide, water vapor, or combustible materials in the exhaust gas is additionally observed. At the moment of the light-off of the catalytic converter, the signals of these sensors change rapidly, such that the light-off time and thus the light-off temperature of the catalytic converter can be exactly determined. Suitable devices for external use in workshops or monitoring stations, as well as for on board installation, are given. The continuous storage of the sensor-indicated light-off temperatures and light-off times is expedient in order to observe the gradual aging of the catalytic converter until it has reached an intolerable state.

24 Claims, 2 Drawing Sheets

FOREIGN PATENT DOCUMENTS

| | | |
|---|---|---|
| DE | 43 37 793 A1 | 5/1995 |
| DE | 35 00 594 C2 | 8/1995 |
| DE | 195 37 363 A1 | 7/1996 |
| DE | 196 43 674 A1 | 4/1997 |
| DE | 195 41 903 A1 | 5/1997 |
| DE | 197 32 167 A1 | 1/1998 |
| DE | 197 58 154 A1 | 8/1998 |
| GB | 2 310 044 A | 8/1997 |
| JP | 11 229854 A | 8/1999 |

\* cited by examiner

PROCESS AND DEVICE FOR MONITORING AND OBSERVATION OF AGING OF A CATALYTIC CONVERTER IN EXHAUST GAS OF INTERNAL COMBUSTION ENGINES AND OF EMISSION OF HAZARDOUS MATERIALS

BACKGROUND OF THE INVENTION

The invention relates to a process and a device for monitoring and observation of the aging of a catalytic converter in the exhaust gas of internal combustion engines, for example in motor vehicles, and for registration of the times of the largest emission of hazardous materials of the internal combustion engine.

Catalytic converters in the exhaust gas system of internal combustion engines first begin, after reaching a relatively high operating temperature, to convert the hazardous materials in the exhaust gas, i.e., hydrocarbons, carbon monoxide, and nitrogen oxides, largely into non-hazardous materials. In the first time interval after the internal combustion engine is started, the hazardous materials can pass through the catalytic converter in a practically unhindered manner. Therefore, the newer exhaust gas specifications provide for measurement cycles, which especially include cold and warm start-up phases. It is apparent therein that during these measurement cycles the major part of the hydrocarbon emission arises during the cold start phases. In order to reduce the emission of hazardous materials, a low "light-off temperature" of the catalytic converter, and thus after starting, as short as possible a "light-off time" without exhaust gas cleaning, must be sought in particular. Many proposals have already been made for reducing the light-off time.

In order to check the operation of the catalytic converter by OBD (on board diagnosis), many tests are made using sensors, especially for hydrocarbons ($CH_x$) and for nitrogen oxides ($NO_x$). Measurements using expensive measurement systems (with flame ionization detectors: FID) show, however, that after commercial, hot, new exhaust gas catalytic converters or ones that have already been used for a longer time, at least the $CH_x$-concentrations are exceptionally small. These concentrations cannot be measured in a fully certain manner, even with the FID, and are much less able to be quantitatively determined using sensors for $CH_x$ or $NO_x$ thus far known. Therefore, it is also difficult to use these mechanisms to track the aging of the catalytic converter by any gradual increase in the $CH_x$ concentration in the exhaust gas after the catalytic converter.

In order to assess the aging of the exhaust gas catalytic converters, a series of processes have been proposed, in which the hazardous materials concentrations in the exhaust gas are not measured directly. Frequently, the necessary oscillation between rich and lean in the fuel supply is not only regulated using a lambda sensor, which is an oxygen sensor, before the catalytic converter, but also, its effect is tracked using a second lambda sensor after the catalytic converter (see German patent publications DE 23 04 622, DE 24 44 334, DE 35 00 594, DE 41 39 560, DE 42 11 116, DE 43 37 793). Therein, certain charging programs on the catalytic converter system and different switching operations of the signals are used in order to be able to assess the functioning ability of the catalytic converter. Furthermore, it has been proposed to monitor the catalytic converter activity with one temperature sensor shortly before the catalytic converter and another one within the catalytic converter (DE 26 43 739). These proposals generally refer to the operating condition of the catalytic converter system and produce no direct statement about the light-off of the catalytic converter.

The aging of the exhaust gas catalytic converter can be noticed, however, especially in the increase of its light-off temperature, and thus also of the light-off time. Therefore, it has already been proposed to determine the light-off temperature of the catalytic converter and to assess the functional ability of the catalytic converter in this way. It is assumed therein that the temperature in the exhaust gas catalytic converter increases more quickly as soon as the conversion begins, so that the light-off temperature as well as the time span until the beginning of the conversion can be read directly from the temperature-time curve and can be compared to predetermined threshold values (DE 42 11 092). It should be advantageous if the temperature is determined particularly in the area of the catalytic converter system, which is decisive for the warm-up emission (DE 43 30 997). However, the light-off temperature is not represented clearly at all in the temperature-time curve; it is possibly blurred by endothermic desorption processes during the light-off. With the gradual aging of the catalytic converter, the light-off temperature is less and less recognizable. Therefore, these processes are evidently not adequate. As a gradual process, the aging cannot be followed, using the processes known thus far, up to the point at which the catalytic converter is declared to be functionally inoperative.

On motor test stands the light-off of the catalytic converter can be clearly observed, using expensive stationary FID-devices, by the drastic drop of the $CH_x$-concentration in the exhaust gas. On board motor vehicles correspondingly repeatedly reliable observations for checking the aging of exhaust gas catalytic converters and the hazardous materials emission have thus far not been possible using simple mechanisms.

SUMMARY OF THE INVENTION

It is an object of the invention to eliminate the disadvantages of the prior art, in particular to provide a process with the corresponding device by which the aging of exhaust gas catalytic converters can not only be monitored on occasion, but also over its entire gradual progression, and which at the same time leads to a quantity that is characteristic for individual starting phases or for the total of the hazardous materials emitted in the start phases.

This object is achieved according to the present invention by a process wherein, after the start of the internal combustion engine, the light-off temperature of the catalytic converter is detected, using a temperature measuring sensor in the catalytic converter, as the temperature at which a sensor for oxygen, carbon dioxide, water vapor or combustible materials in the exhaust gas after the catalytic converter indicates the light-off of the catalytic converter by a signal change as a result of a sudden change of the concentration of the material or material mixture for which the sensor is sensitive, and wherein the light-off time is measured from the start-up of the internal combustion engine to the sensor-indicated light-off of the catalytic converter. The light-off temperature is measured at the exact point in time at which the change in the concentration of the material or material mixture in the exhaust gas detected by the sensor goes through an extreme value, where this extreme value can be obtained by calculating the differences of the sensor signals directly measured in equivalently short time intervals, or mathematical expressions calculated therefrom, or concentrations calculated thereby.

The sensor-indicated light-off temperature as well as the light-off time are measured externally in workshops or monitoring stations and/or determined in the motor vehicle and displayed on board. Advantageously, the values determined after every start-up will be continuously saved on board and processed into statements about the aging and hazardous material emission. As a sensor, one is used that requires a shorter time for heating to operating temperature than the exhaust gas catalytic converter and can immediately follow the concentration changes very quickly. If such prerequisites are not provided, the heating up of the sensor to its operating temperature is to be provided before start-up.

It is advantageous if, as the sensor for the determination of the light-off of the catalytic converter, an oxygen sensor is used in which the catalytic activity of the measuring sensor is smaller than the conventional lambda sensors. In particular, it is expedient that the oxygen sensor used be brought to a temperature at which its combustion gas sensitivity is smaller than its oxygen sensitivity.

It is further advantageous if the temperature measuring sensor and/or the sensor is brought only temporarily for individual monitoring measurements in a motor vehicle into positions for determining the light-off temperature and/or the light-off time of the catalytic converter, or that the temperature measuring sensor and/or sensor is installed fixed in the motor vehicle and thereby, after each start-up of the internal combustion engine, the light-off temperature and/or light-off time is determined on board and saved.

Expediently, the increase of the light-off temperature of the catalytic converter above the light-off temperature of the new catalytic converter is used as one value that characterizes the aging of the catalytic converter, or the average of several (for example 5 to 10) light-off temperatures measured one after the other is calculated, and the increase of this average value above the average value at the beginning of the use of the new catalytic converter is used as a value that characterizes the aging of the catalytic converter.

The time from the start of the internal combustion engine up to the light-off of the exhaust gas catalytic converter greatly depends on the temperature of the catalytic converter at the moment of the start-up of the machine. The process according to the invention is, however, to be further advantageously operated in that only the times from the passage of a specified lower temperature of the catalytic converter until reaching the light-off temperature of the catalytic converter in comparison to this time for the new catalytic converter are used as "basis-normalized light-off times" for characterization of the aging of the catalytic converter, wherein as a lower temperature, a value of 20 to 100 Kelvin above the yearly average of the ambient temperature in the usage region of the motor vehicle, is specified, or that by itself or in addition, the average of several (for example 5 to 10) basis-normalized light-off times of the catalytic converter is calculated, and the increase of the average of the basis-normalized light-off times in comparison to the average value of the basis-normalized light-off times measured at the beginning of the usage of the new catalytic converter, is used as a value characterizing the aging of the catalytic converter.

Expediently, the measurements for performing the process are only triggered if the temperature of the catalytic converter does not exceed a lower temperature that is specified, such that the heat-up time of the sensor used is, in any case, shorter than the light-off time of the catalytic converter.

An additional advantageous embodiment of the process according to the invention consists in that the sum of all measured and saved complete light-off times is calculated and is saved on board as a value characteristic for the major part of the hazardous material emission, and is made readable there and/or in a workshop or monitoring station, and that this sum is divided by the distance travelled by the motor vehicle since the beginning of the measurements, and thus a characteristic value is obtained for the use of the motor vehicle involved.

For the protection of the gas sensor, it is expedient that the heating thereof is switched off or reduced after use in the start phase of the internal combustion engine.

The device according to the invention for performing the process is thus wherein the signal lines of a temperature measuring sensor positioned (at a suitable location) in or on the catalytic converter and a sensor for oxygen, carbon dioxide, water vapor or combustible materials in the exhaust gas arranged after the catalytic converter, as well as a line transmitting the start up of the internal combustion engine, are connected to an evaluation and arithmetic unit that is externally connectable or installed in the motor vehicle and that is equipped to detect the light-off temperature of the catalytic converter and/or the total light-off time and/or the basis-normalized light-off time of the catalytic converter, according to the process to calculate, to save and/or to make externally readable on a monitoring device, arithmetically formed characteristic values for the aging of the catalytic converter and for the major part of the hazardous material emission as well as for an aspect of the usage of the vehicle, and/or to display these values directly on an on-board instrument.

It is expedient that the temperature measuring sensor and/or the sensor and the evaluation and arithmetic unit be constructed as individual parts for use in different motor vehicles, if only occasional checks are planned, or that the temperature measuring sensor and the sensor as well as the evaluation and arithmetic unit be installed fixed in the motor vehicle with registers for determined characteristic data, in particular that the evaluation and arithmetic unit be integrated into a computer located on board the motor vehicle.

Additional details of the process and device for performing the process according to the invention are to be gathered from the dependent claims.

A great advantage of the described process consists in that important data for the aging of the exhaust gas catalytic converter, for hazardous materials emission and for an aspect of the use of the motor vehicle with an internal combustion engine, to which it is applied, are obtained with the use of sensors that are already relatively well known and are obtained by the use of arithmetic techniques known in principle. The process is thus realizable in a relatively easy manner using the given practical experience.

An additional great advantage consists in that the process can be used by workshops and monitoring stations on motor vehicles in which no corresponding measurement system is installed. On the other hand, the process allows, when the device is installed in the motor vehicle, a comfortable constant monitoring of the exhaust gas system by the motor vehicle operator.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings.

DETAILED DESCRIPTION OF THE INVENTION

Figure 1:
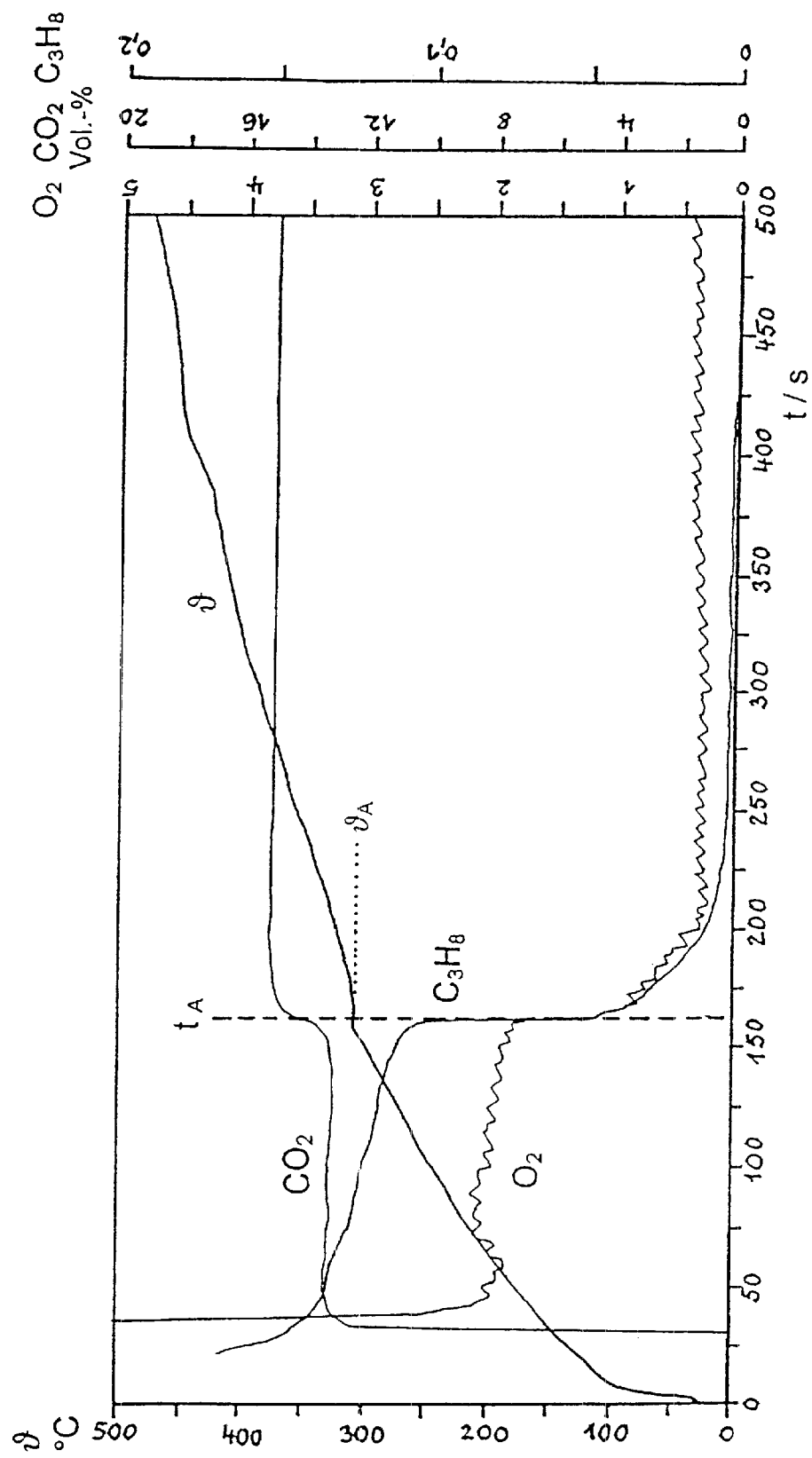
FIG. 1 is a graph of measurement results using the process and device of the invention, as they arise on motor test stands.

In FIG. 1 an example is depicted for the progression of the concentrations of oxygen ($O_2$), of carbon dioxide ($CO_2$), and the hydrocarbon propane ($C_3H_8$) in the first 500 seconds after the start-up of the internal combustion engine. In addition, the progression of the Celsius temperature $\theta$ in the exhaust gas catalytic converter is shown during this time. One skilled in the art will recognize that even after a short time the oxygen concentration falls below the value in air (20.6 vol.-%), and the concentration of carbon dioxide increases well above the value in air (0.036 vol.-%), which indicates a corresponding partial combustion in the rapidly heating cylinders of the internal combustion engine. After an additional time, rapid changes of the measured concentrations of oxygen, carbon dioxide, and propane occur. For the concentrations different scales can be selected, whereby in FIG. 1 different large jumps in concentration result. It is essential that, aside from the rapid change in the concentration of the hydrocarbon, at the same point in time rapid changes in the $O_2$ and $CO_2$ concentration are apparent. Without a doubt, all three jumps in concentration mark the same process, namely the light-off of the exhaust gas catalytic converter. From the temperature-time curve, the moment of this light-off cannot be clearly recognized. The light-off temperature $\theta_A$ is, however, exactly obtained using the light-off time $t_A$, which results with the jumps of the sensor signals or the concentrations calculated with it. In the example presented $\theta_A$ is at 310° C. and $t_A$ is at 162 sec. These values result with the progression of the $O_2$ and $CO_2$ concentration, just as with the progression of the $C_3H_8$ concentration. It was thus found that the light-off temperature and the light-off time of the exhaust gas catalytic converter can be determined using $O_2$ and $CO_2$ sensors, in principal just as well as with hydrocarbon sensors. Also, the sum of the concentrations of combustible materials or the residual combustion enthalpy of the exhaust gas at the measurement point after the exhaust gas catalytic converter and, in addition, the concentration of the water vapor in the exhaust gas rapidly change at the same point in time as a result of the after-burning applied in the exhaust gas catalytic converter. From this, the advantage of the process results that very different sensors can be used in order to determine the point in time of the same operation.

Figure 2:
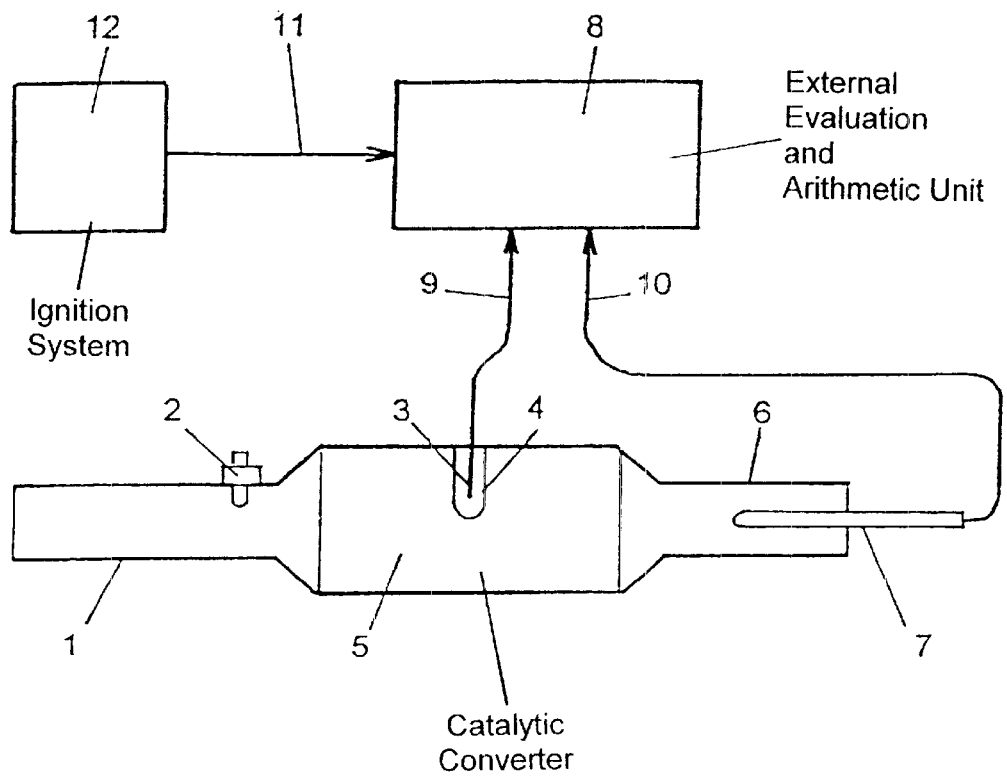
FIG. 2 is a schematic diagram showing the connection of elements for performing the process of the invention on a vehicle without an installed device.

In FIG. 2 is shown the exhaust system 1 of a motor vehicle with a (known) lambda sensor 2 for monitoring the ratio of motor fuel and air in the combustion mixture. The temperature sensor 3 lies here with its measuring point in an indentation 4 accessible from the outside in the exhaust gas catalytic converter 5. Inserted into the exhaust gas pipe 6 after the exhaust gas catalytic converter 5 is, for example, a probe having an oxygen sensor 7, whose measuring sensor has a low catalytic activity and can be heated up within a short time, for example to 800° C. Switched on when the machine is started, it reaches its operating temperature prior to reaching the light-off temperature of the exhaust gas catalytic converter 5, at which its combustion gas sensitivity is smaller than its oxygen sensitivity. The external evaluation and arithmetic unit 8 is connected via the signal lines 9 and 10 to the temperature sensor 3 and to the sensor 7. Aside from that, a connection is made via the signal line 11, which transmits the point in time of the start-up of the internal combustion engine, for example, from the ignition system 12.

In the external evaluation and arithmetic unit 8, as may be necessary, an impedance conversion of the signals occurs, at an interval of a few hundredths of a second the calculation of the Celsius temperature of the exhaust gas catalytic converter 5, from the signals of the sensor 7 the calculation of differences, which function for the determination of the extreme value of the gas concentration changes, and the output of the temperature when this extreme value is reached and/or the time that has passed since the passage of, for example, 100° C. until light-off (the basis-normalized light-off time).

Figure 3:
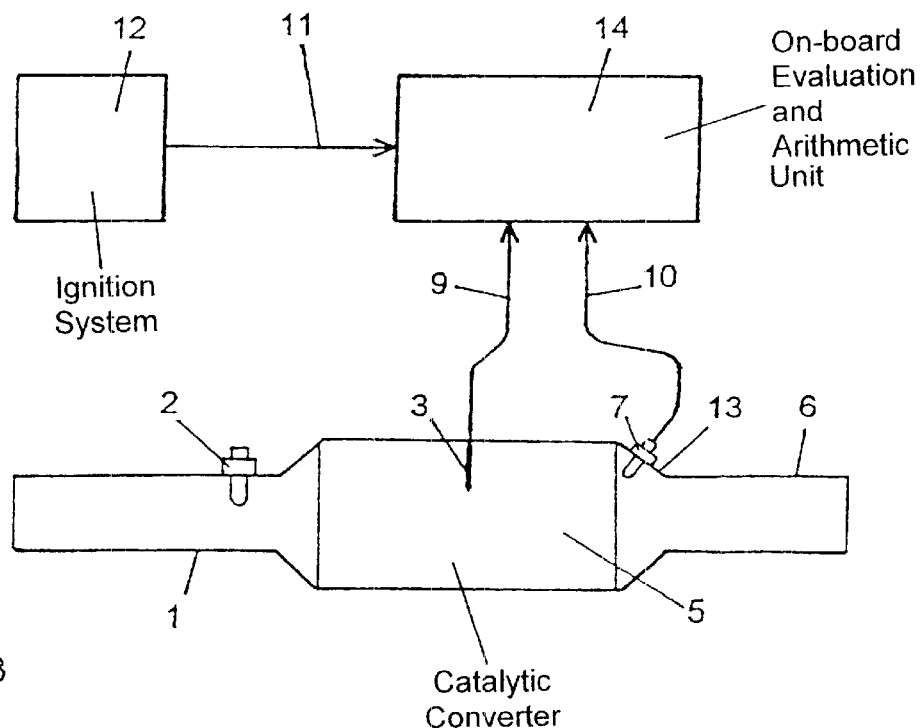
FIG. 3 is a schematic diagram showing the connection of elements for performing the process of the invention with the device installed in the motor vehicle

In FIG. 3 the device is shown having a fixed installation in the motor vehicle. The temperature sensor 3 here has its measuring point in a functionally selected part of the exhaust gas catalytic converter 5, the sensor 7 in the outlet piece 13 of the housing of the exhaust gas catalytic converter 5.

The fixed installation of the device in the motor vehicle brings, as opposed to the external device, the advantage that the evaluation and arithmetic unit 14 located on board makes possible a more extensive and informative program. Aside from the impedance conversion of signals, the calculation of the temperature of the exhaust gas catalytic 5, the calculation of differences from the signals of the sensor 7, which function for the determination of the extreme value of the gas concentration changes, and the output of the temperature when this extreme value is reached, and thus the current light-off temperature and/or the output of the light-off time, which runs between a selected temperature value and the reaching of the light-off temperature (the basis-normalized light-off time), this unit 14 can perform additional determinations via a selected number of saved results of several starting operations and can take into account the temperature of the catalytic converter 5 during start-up and triggering of the process execution.

In addition, it can sum up all of the complete light-off times measured in the motor vehicle from the start-up of the machine until reaching the light-off temperature, and in this way deliver characteristic values for hazardous materials emission. The output of these values can be provided on devices on board and/or when called up at workshops or monitoring stations outside of the motor vehicle.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

I claim:

1. A process for monitoring aging of a catalytic converter (5) in an exhaust system of an internal combustion engine and for storing of times of largest emission of pollutants of the internal combustion engine, comprising the steps of:

establishing a start-up time of the engine;

determining a light-off temperature of the catalytic converter (5) using a temperature sensor (3) in or on the catalytic converter (5), the light-off temperature being the temperature at which a sensor (7) for oxygen, carbon dioxide, water vapor or combustible materials located in the exhaust system after the catalytic converter (5), indicates the light-off of the catalytic converter (5) by a sudden change of concentration of a material or material mixture for which the sensor (7) is sensitive, and measuring an elapsed time from the start-up of the internal combustion engine to the sensor-indicated light-off of the catalytic converter (5).

2. The process according to claim 1, wherein the light-off temperature and the light-off time are readable on board and/or externally in workshops or monitoring stations.

3. The process according to claim 1, wherein the light-off temperature of the catalytic converter (5) is determined at a point in time at which a change in the signal of the sensor (7), or a mathematical expression calculated therefrom, or a concentration calculated therefrom, goes through an extreme value.

4. The process according to claim 3, wherein an extreme value of the change of the concentration of a material or material mixture is determined in the exhaust gas via a calculation of the differences of the sensor signals measured in equivalently short time intervals, or mathematical expressions calculated therefrom, or the concentration calculated therefrom.

5. The process according to claim 1, wherein when an oxygen sensor is used as the sensor (7) for the determination of the light-off of the catalytic converter (5), the catalytic activity of the oxygen sensor is smaller than that of lambda sensors.

6. The process according to claim 5, wherein the oxygen sensor is brought to a temperature at which its combustion gas sensitivity is smaller than its oxygen sensitivity.

7. The process according to claim 1, wherein a time from start-up of the internal combustion engine and simultaneous switching on of a sensor heater until an operating temperature of the sensor (7) is reached is smaller than the light-off time of the catalytic converter (5).

8. The process according to claim 6, wherein heating up of the sensor (7) is switched on prior to the start up of the internal combustion engine.

9. The process according to claim 1, wherein the temperature sensor (3) and/or the sensor (7) are only brought temporarily into positions for individual monitoring measurements in a motor vehicle for determining the light-off temperature and/or the light-off time of the catalytic converter (5).

10. The process according to claim 1, wherein the temperature sensor (3) and/or sensor (7) are fixed in a motor vehicle and with them, after each start-up of the internal combustion engine, the light-off temperature and/or light-off time is determined on board and saved.

11. The process according to claim 1, wherein an increase of the light-off temperature of the catalytic converter (5) above a light-off temperature of a new catalytic converter (5) is used as a value which characterizes the aging of the catalytic converter (5).

12. The process according to claim 1, wherein an average value of several light-off temperatures measured one after another is calculated, and an increase of this average value above an average value at a beginning of use of a new catalytic converter (5) is used as a value which characterizes the aging of the catalytic converter (5).

13. The process according to claim 1, wherein, an increase in time to pass from a specified lower temperature of the catalytic converter (5) to the light-off temperature of the catalytic converter (5) in comparison to a corresponding time for a new catalytic converter (5) as a basis-normalized light-off time, is used for characterization of the aging of the catalytic converter (5), wherein as the specified lower temperature, a value 20 to 100 Kelvin above a yearly average of ambient temperature in a usage region of the internal combustion engine is determined.

14. The process according to claim 1, wherein, an average value of several basis-normalized light-off times of the catalytic converter (5) are calculated, and an increase of the average value of the basis-normalized light-off times in comparison to an average value of basis-normalized light-off times measured at a beginning of usage of a new catalytic converter is used as a value characterizing the aging of the catalytic converter (5).

15. The process according to claim 1, wherein measurements for performing the process are triggered only when a temperature of the catalytic converter (5) does not exceed a lower temperature that is specified such that heat-up time of the sensor (7) used is shorter than the light-off time of the catalytic converter (5).

16. The process according to claim 1, wherein a sum of all measured and saved complete light-off times is calculated and is saved on board as a characteristic value for a major part of the hazardous material emission, and is made readable on board and/or in a workshop or monitoring station.

17. The process according to claim 1, wherein a sum of all measured light-off times characteristic of a major part of the pollutant emission is divided by a distance traveled by a motor vehicle equipped with the internal combustion engine and with the catalytic converter (5) since a beginning of measurements, and thus a characteristic value is obtained for use of the motor vehicle.

18. The process according to claim 1, wherein heating of the sensor (7) is turned off or reduced after its use in a start phase of the internal combustion engine.

19. A device for monitoring of aging of a catalytic converter (5) in an exhaust system of an internal combustion engine and for storage of times of largest emission of pollutants of the internal combustion engine, comprising wherein signal lines (9, 10) of a temperature measuring sensor (3) positioned in or on the catalytic converter (5) and a sensor (7) for oxygen, carbon dioxide, water vapor or combustible materials arranged in the exhaust system, positioned after the catalytic converter, as well as an electric line (11) transmitting a start up of the internal combustion engine are connected to an evaluation and arithmetic unit (8, 14) which is externally connectable or installed in a motor vehicle, and which is assembled in order to calculate and/or to store a light-off temperature of the catalytic converter (5) and/or a light-off time and/or a basis-normalized light-off time of the catalytic converter (5), and/or to make externally readable on a monitoring device, arithmetically-calculated characteristic values for aging of the catalytic converter (5) and for a major part of pollutant emission as well as for an aspect of usage of the motor vehicle, and/or to display these values directly on an on-board instrument.

20. The device according to claim 19, wherein the sensor (7) is an oxygen sensor whose measuring sensor has a catalytic activity smaller than conventional lambda sensors, and where its sensitivity for combustion gas at an operating temperature is smaller than its oxygen sensitivity.

21. The device according to claim 19, wherein for the sensor (7) a time from start-up of the internal combustion engine and a simultaneous switching on of sensor heating until reaching an operating temperature is shorter than the light-off time of the catalytic converter (5).

22. The device according to claim 19, wherein the temperature measuring sensor (3) and/or the sensor (7) as well as the evaluation and arithmetic unit (8) are designed as individual parts for use on different motor vehicles.

23. The device according to claim 19, wherein the temperature measuring sensor (3) and the sensor (7) as well as the evaluation and arithmetic unit (14) are fixed in the motor vehicle with storage for detected characteristic data.

24. The device according to claim 23, wherein the evaluation and arithmetic unit (14) is integrated into a computer located on board the motor vehicle.

* * * * *